Nov. 20, 1923.
J. F. SCOTT
1,474,448
PAN SHIFTER
Filed Nov. 26, 1921
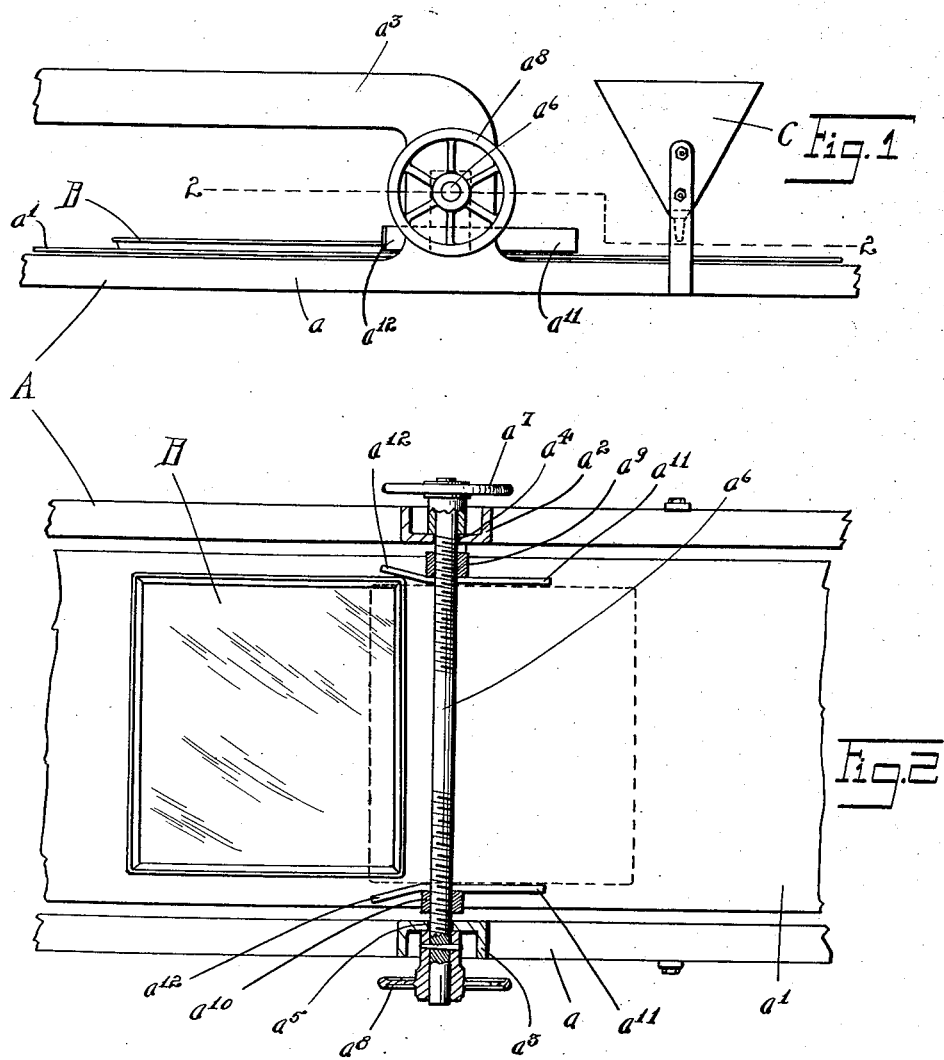
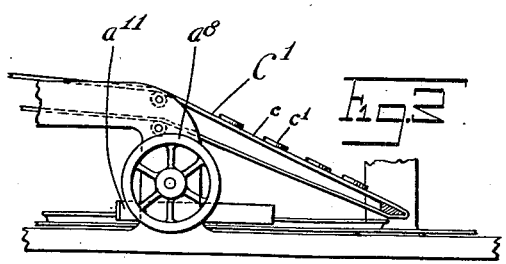
Inventor
Joseph F. Scott
By Walter F. Murray
Attorney Patented Nov. 20, 1923.

UNITED STATES PATENT OFFICE.

JOSEPH F. SCOTT, OF DENVER, COLORADO, ASSIGNOR TO THE J. H. DAY COMPANY, A CORPORATION OF OHIO.

PAN SHIFTER.

Application filed November 26, 1921. Serial No. 518,081.

*To all whom it may concern:*

Be it known that I, JOSEPH F. SCOTT, a citizen of the United States of America, and a resident of Denver, in the county of Denver and State of Colorado, have invented a new and useful Improvement in a Pan Shifter, of which the following is a specification.

My invention relates to devices adapted to shift or position baking pans on a conveyor. The pans have various deposits placed upon them as they are carried by the conveyors, and my invention is concerned in providing means to position the pans in the proper relation to the conveyor so that the deposits will be made at the proper places on the pans. In conveyors the belts will sag, due to imperfections in the weaving thereof, with the result that the pans are often moved out of alignment from the position which they should occupy in order to have dough blanks placed thereon in proper positions. The same is true when pans carrying cakes are to be carried below various devices adapted to discharge fillers and icings on the cakes.

An object of my invention is to provide a simple and efficient shifting device of the type referred to.

Another object is to provide such device which may be readily applied to conveyor systems.

These and other objects are attained by the means described herein and disclosed in the accompanying drawings, in which:—

Fig. 1, is a fragmental side elvation of a conveyor and hopper adjacent to which a pan shifter embodying my invention is mounted.

Fig. 2, is an enlarged view on line 2—2 of Fig. 1.

Fig. 3, is a side elevation of a panning device employed with a conveyor and shifter embodying my invention.

The table $a$, of the conveyor system A, has mounted on it an endless belt $a'$, which may be moved in any suitable manner so as to carry pans B longitudinally of the table. The hopper C, or other discharge device C', may be adapted to deposit directly upon the pans or upon cakes on the pans in any of the manners and by any of the means employed in the art for this purpose.

When pans are to be presented to the hopper C, or panning belt C', the pans must be positioned in a definite spaced relation to the hopper or panning belt. The arms $a^2$ and $a^3$, mounted on the opposite sides of the table and extending upwardly therefrom, have aligned bores $a^4$ and $a^5$, respectively, in which is revolubly mounted a shaft $a^6$, carrying hand wheels $a^7$ and $a^8$, upon its opposite ends. The shaft is threaded intermediate its ends and blocks $a^9$ and $a^{10}$ having threaded bores, are mounted on the shaft. Each block carries a wing $a^{11}$ which depends therefrom and lies immediately above the apron or belt $a'$, being spaced from the belt only sufficient to clear the belt. The rear ends $a^{12}$ of the wings are bent outward, wherefore the rear ends of the wings diverge. The forward ends of the wings extend in substantial parallelism and are spaced at a distance equal to the width of the pans B, that are carried by the belt. The threads on the shaft extend in a common direction, wherefore, when the shaft is revolubly actuated, the wings are moved in a common direction across the conveyor. The conveyor brings the pans into engagement with the divergent ends of the wings, and the further movement of the pans by the belt will deflect the pans between the parallel portions of the wings and thereby position the pans in the desired relation to the conveyor belt, the table and the discharge or hopper device C or C'.

The panning device C', shown in Fig. 3, comprises a belt $c$, on which cakes $c'$ are carried, which cakes are deposited upon the pans B.

What I claim is:—

1. In a pan shift device the combination of a conveyor for pans, arms extending adjacent the conveyor, a shaft mounted on the arms, and guide blocks mounted on the shaft adapted to shift the pans laterally on the conveyor.

2. In a pan shift device the combination of a conveyor for pans, a shaft extending transversely of the conveyor, and means on the shaft adapted to shift the pans laterally on the conveyor.

3. In a pan shift device the combination of a conveyor for pans, a threaded revoluble shaft mounted transversely of the conveyor, blocks mounted on the threaded shaft adapted to be actuated transversely of the conveyor by the rotation of the shaft, and guide wings mounted on the blocks, said wings having substantially parallel forward ends and diverging rear ends, the conveyor being adapted to carry the pans into engagement with the rear ends of the wings, and the parallel portions of the wings being adapted to shift the pans so that the opposite ends of the pans will extend in parallelism with the wings as the pan is carried thru and beyond the wings.

4. In a pan shift device the combination of a conveyor for pans, a revoluble threaded shaft, and means carried by the shaft for determinably positioning pans on the conveyor.

5. In a pan shift device, the combination of a conveyor for pans, a revoluble shaft and means carried by the shaft and adjustable by the rotation thereof, for determinably positioning pans on the conveyor.

In testimony whereof, I have hereunto subscribed my name this 19 day of November, 1921.

JOSEPH F. SCOTT.